(No Model.)   J. LAWRIE.   3 Sheets—Sheet 2.
CULTIVATOR.
No. 415,540.   Patented Nov. 19, 1889.
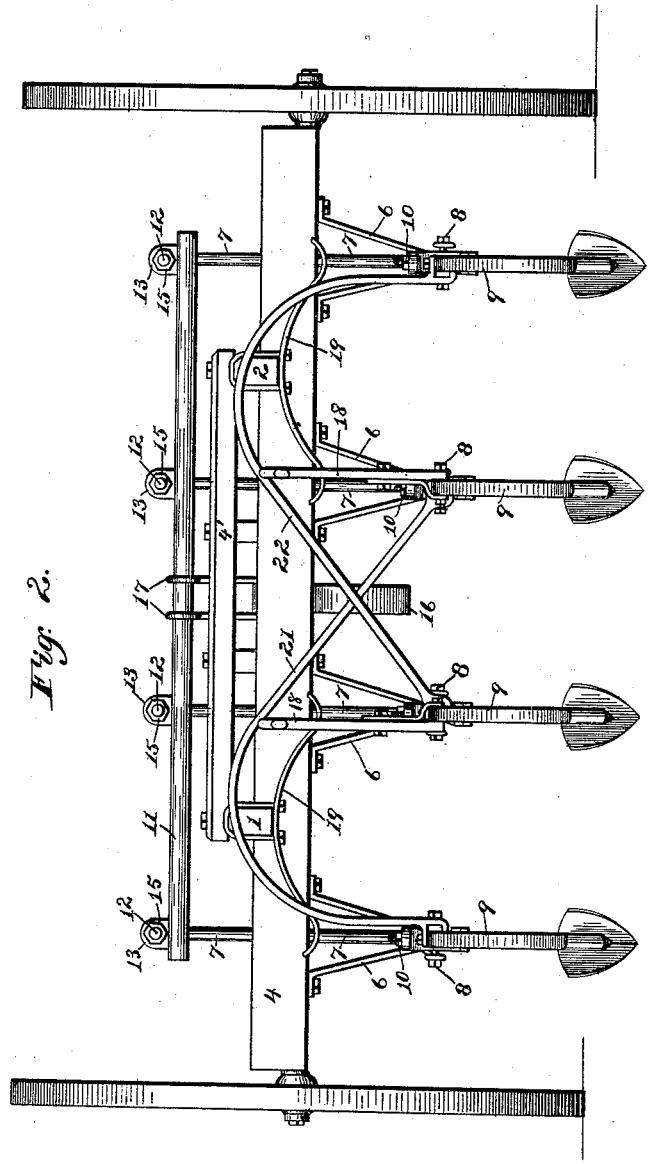
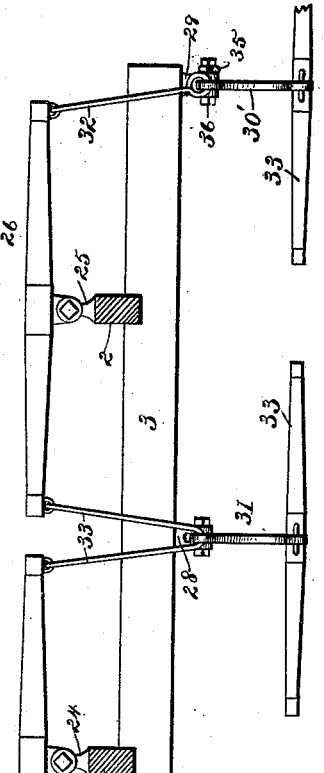
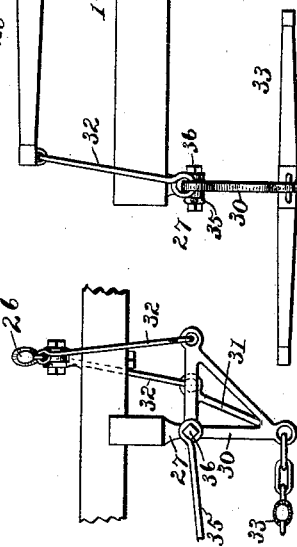
WITNESSES:   INVENTOR
   John Lawrie
By Edson Bros,
   Attorneys.

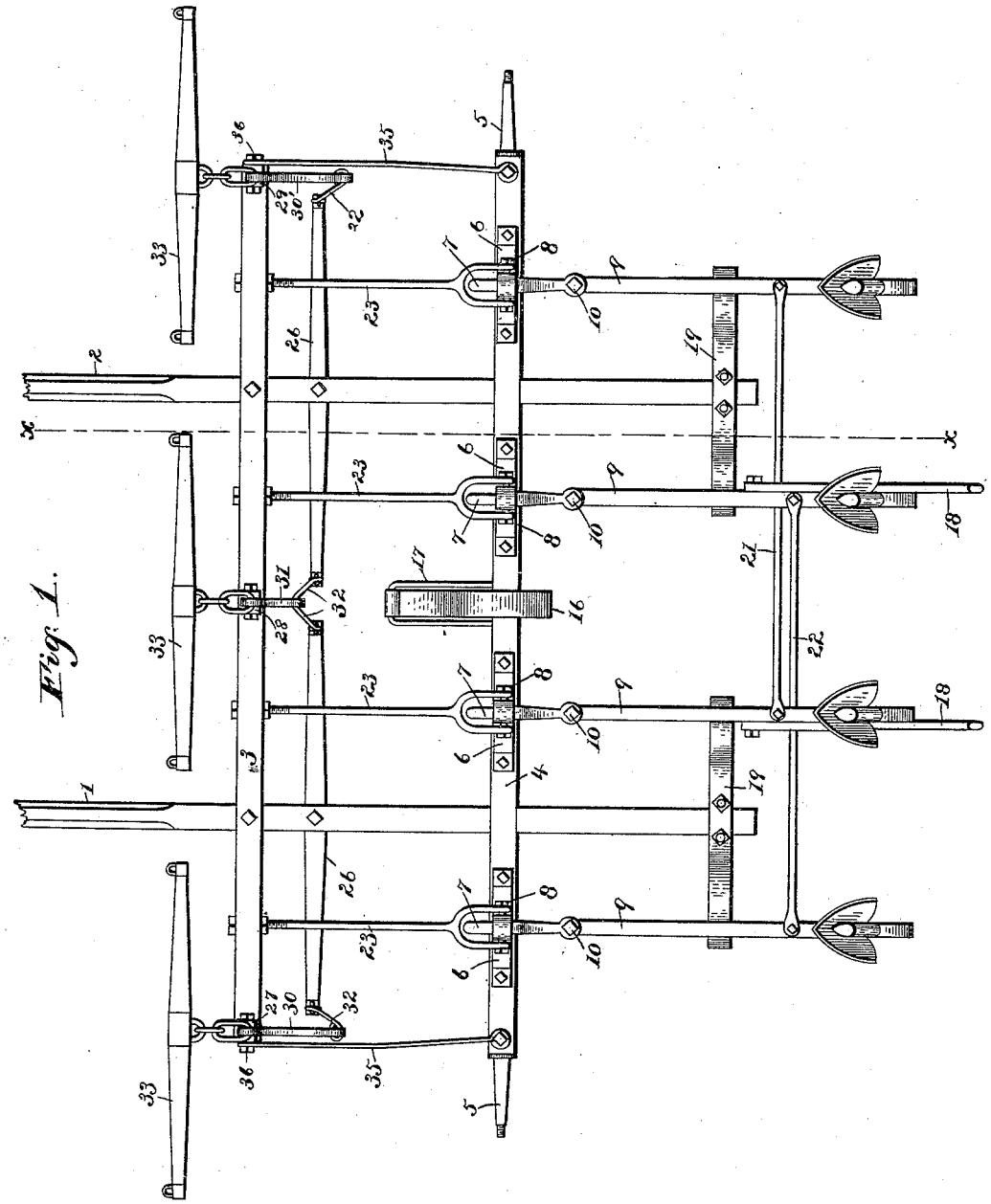

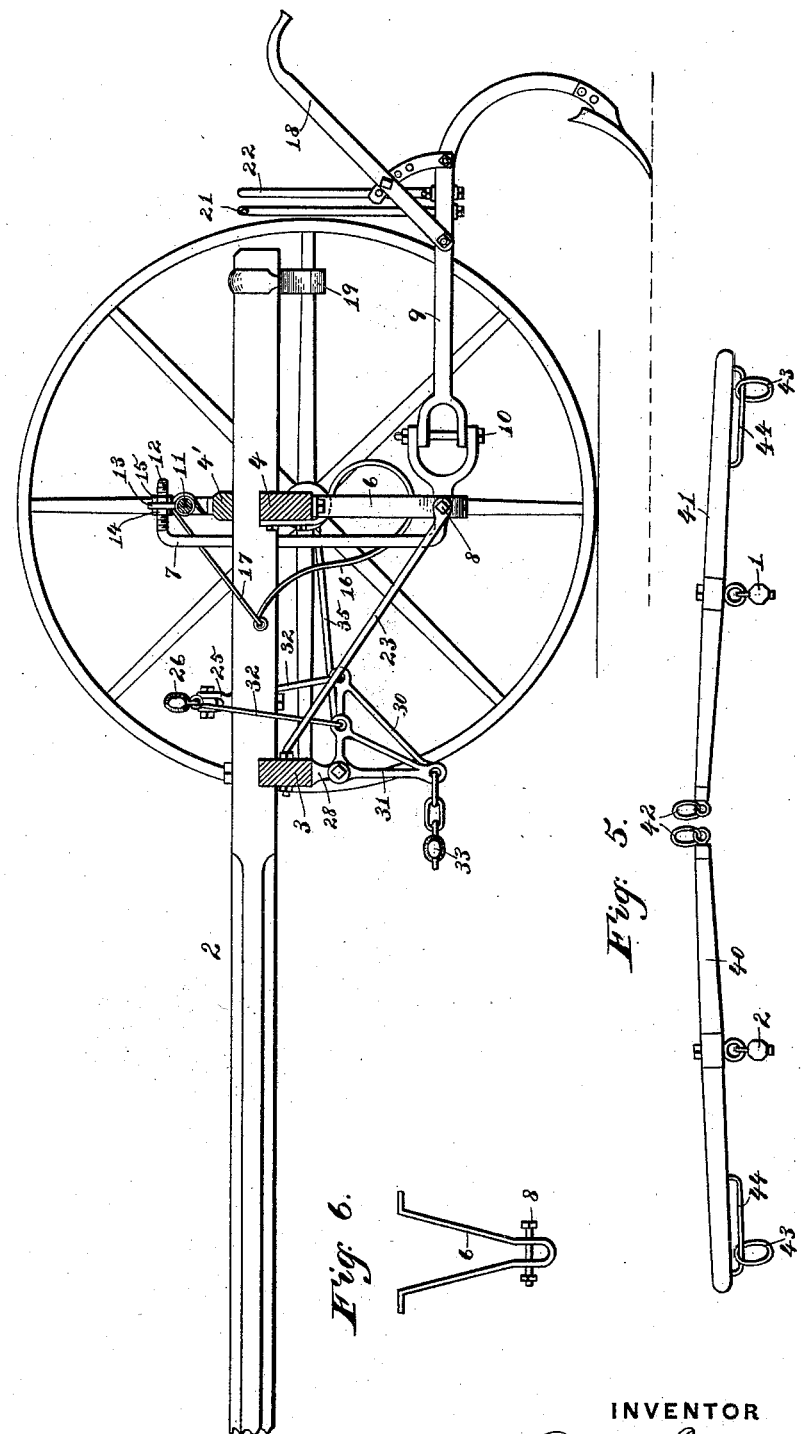

UNITED STATES PATENT OFFICE.

JOHN LAWRIE, OF BROOKSTON, INDIANA.

CULTIVATOR.

SPECIFICATION forming part of Letters Patent No. 415,540, dated November 19, 1889.

Application filed June 28, 1889. Serial No. 315,916. (No model.)

*To all whom it may concern:*

Be it known that I, JOHN LAWRIE, a citizen of the United States, residing at Brookston, in the county of White and State of Indiana, have invented certain new and useful Improvements in Double Straddle-Row Cultivators; and I do hereby declare the following to be a full, clear, and exact description of the invention, such as will enable others skilled in the art to which it appertains to make and use the same.

My invention relates to a double straddle-row cultivator; and it has primarily for its object to cultivate at the same time both sides of two rows of either corn or cotton plants, which are dropped in parallel lines by the two-row planter.

In constructing a cultivator designed to accomplish the primary object above stated difficulty has been experienced in guiding the four plows necessary to cultivate the two rows, so that one attendant walking behind the machine can easily govern the plows, which is due to the separated positions of the four plows and to the weight thereof.

Another objection to be overcome in a cultivator of this class is the liability of the three draft-animals necessary to operate the machine trampling down the rows of plants and the additional difficulty of arranging a tripletree that will not break down the growing plants under cultivation.

I have entirely overcome these objections in my invention, the first part of which consists in the combination, with the series of plow-beams, of couplers which are connected to the alternate beams, so that the beams are coupled in pairs, and the handles of two beams can be grasped by the attendant to readily control the position of all four plows. These couplers are preferably arched to adapt them to clear the intermediate plow-beam of the pair of beams to which said couplers are connected, and also to rise above the plants being tended.

The second part of my invention consists of a rigid shackle bar or lever fulcrumed on a suitable support or hanger and to which a plow-beam is coupled, an elevated shaft or bar with which the shackle bar or lever is connected, and a spring connected with the rock-shaft in such a manner as to counterbalance the weight of the plow-beam connected thereto through the shackle bar or lever, whereby the burden of weight of the plow-beam is taken up by the counterbalancing-spring and the operator relieved of the necessity of lifting the entire weight of the plow-beam. The depth that it is desired to have the plows penetrate the ground can be regulated by adjusting the shackle bars or levers, which are connected adjustably to the rock-shaft and have a rigid vertical connection with the plow-beam. The weight and leverage of these shackle bars or levers supplement the counterbalance-spring when it relaxes its tension—as, for instance, when the plows are elevated and suspended—and the greater part of the weight of the plow-beams is thus relieved when the operator desires to either raise or lower the plow-beams to or from their suspending devices.

My invention further consists in the mechanism by which the three draft-animals can be hitched to the machine in such manner as to cause the middle horse to walk between the two rows being cultivated, while the outside horses walk in the open spaces on the outside of said rows. I employ three whiffletrees, which are hung under the frame of the machine, and each whiffletree is suspended from one arm of a lever, which in turn is supported by the main carrying-frame and connected to one of the doubletrees, two of which are provided. These doubletrees are overhung centrally on the main carrying-frame, and to the outer ends of the two doubletrees are connected the levers of the outside whiffletrees, while to the inner ends of said doubletrees the lever of the middle whiffletree is connected, the levers of the outside whiffletrees having greater leverage than the lever of the middle whiffletree. By this arrangement and connection of parts the draft is exerted uniformly on the machine and the several animals are prevented from injuring the rows of plants being operated on.

My invention further consists in a neck-yoke for the draft-animals, which has its poles hung independently on the tongues of the machine and the draft-rings loosely connected to said poles in order to prevent the necks of the draft-animals from becoming sore and galled.

To enable others to understand my invention, I will now proceed to a detailed description of my preferred embodiment thereof in connection with the accompanying drawings, in which—

Figure 1 is a bottom plan view. Fig. 2 is a rear elevation, and Fig. 3 a vertical longitudinal sectional view on the plane indicated by the dotted line $x\ x$ of Fig. 1. Fig. $4^a$ is a vertical transverse sectional view taken across the longitudinal draft-beams in front of the draft appliances to show the latter in front elevation, and Fig. $4^b$ is a detail view in side elevation of the draft appliances. Fig. 5 is a like view of the neck-yoke. Fig. 6 is a detail view of one of the rigid hangers.

Like numerals of reference denote corresponding parts in all the figures of the drawings, referring to which—

1 2 designate the tongues of the machine, which are arranged parallel with each other and fixed or secured to two beams 3 4, which are arranged transversely across the tongues and are rigidly secured thereto in any suitable manner. These tongues and transverse beams constitute the carrying-frame of my improved double cultivator, on which all of the operative parts of the machine are mounted and carried, and the tongues are extended for suitable distances at both ends beyond the beams, in order that the draft-animals and neck-yokes can be connected to their forward ends, while the rear ends of the tongues carry the devices on which the plow-beams are suspended. The rear longitudinal beam 4 of the carrying-beam has secured rigidly thereto the axle 5, and said beam and axle are braced and strengthened by a truss-beam 4', arranged longitudinally above the beam 4 and suitably secured thereto.

A series of vertical hangers 6 are spaced at suitable intervals along the lower side of the beam 4 of the carrying-frame, said hangers being rigidly fixed to said beam by bolts or otherwise. I prefer to make the hangers of the open-loop form shown herein, in order to provide a space or slot at the lower extremity thereof to receive the shackle bar or lever 7; but I would have it understood that I do not deem this particular form of hanger essential, and do not, therefore, restrict myself to the use of the same. Through the lower end of each hanger passes a transverse bolt 8, and on this bolt is fulcrumed or pivoted the lower end of the shackle bar or lever 7, that fits in the lower end of said hanger. The lower end of said shackle-bar has a horizontal arm which is bifurcated and perforated in front of the bifurcated portion to adapt the bolt to pass through the perforation, while into the bifurcated part of said bar or lever fits the front end of the plow-beam 9, the beam and shackle-bar being connected by a vertical bolt 10, which forms a rigid vertical connection between said beam and shackle-bar to cause the beam to move vertically with the shackle-bar, but which permits the beam to swing or turn horizontally on the shackle-bar.

It will be noticed that the arm of the shackle-bar passes through the hanger and that the plow-beam is connected to the rear extremity of said shackle-bar; but the bar proper in front of the hanger extends vertically above the fulcrum and is rigidly connected to a shaft or bar 11, which is arranged in a horizontal position above the carrying-frame and suitably supported thereon.

I provide a series of shackle bars or levers and a like series of plow-beams, which correspond in number to the hangers employed. In practice four of these hangers, shackle-bars, and plow-beams are employed, two being provided for each row of plants that it is designed to cultivate, and the parts of each set are individually connected to one another in the manner described; but all of the series of shackle-bars are connected to the single shaft or bar 11, which is common to all of the shackle-bars. I prefer to connect the series of shackle-bars to the common shaft or bar in such a manner that the shackle-bars can be individually adjusted to raise or lower its plow-beam a limited distance, and thus vary the depth that the plow is designed to enter the ground. The upper end of each shackle-bar is provided with a threaded stem 12, which is adapted to pass through a perforated lug 13, that is made rigid or integral with the shaft or bar 11, and adjusting-nuts 14 15 are fitted on this threaded stem and located on opposite sides of the rigid lug, so that by adjusting the nuts said shackle-bar can be caused to approach or recede from said shaft or bar and thus raise or depress its arm at the lower end and correspondingly adjust the plow-beam, which has a rigid vertical connection with said shackle-bar.

The weight of the plow-beams is counterbalanced by means of a strong heavy spring 16, which is preferably of the class known as a "leaf-spring" and is bent or doubled upon itself. This spring is arranged in a vertical position beneath the rear longitudinal beam 4 of the carrying-frame, at the middle thereof, and one end of this spring is rigidly secured to said beam, while its other end (that extends beyond the vertical plane of the shaft or bar 11) is connected by an intermediate link or rod 17 with said shaft or bar 11. The strength or tension of this underhung spring is exerted on the shaft or bar 11, so as to balance the weight of the plow-beams and thus enable the operator to readily guide and lift the plows with a minimum effort, and this spring is supplemented by the leverage and weight of the shackle-bars and the shaft or bar 11, which is especially useful when the tension of the spring is partly relaxed, owing to the elevated position of the plow-beams when suspended, whereby the operator can readily lift the beams from the suspending devices and lower them.

Each middle plow-beam has the usual handle 18, and to the plow-beam is adapted to be secured any desired kind of implement—as, for instance, a cotton-scraper or shovel-plow, or a turning-plow, or a gopher.

Transversely across each tongue, at the rear extended end thereof, is secured a suspending-bar 19, and to the ends of these suspending-bars on the tongues are adapted to be connected the hook-shaped upper ends of vertical suspension-rods 20, which are secured to the plow-beams, whereby the plow-beams can be suspended from the carrying-frame and thus prevented from coming in contact with the ground.

The plow-beams are connected in pairs by means of couplers 21 22, which are arranged in vertical positions and arched to adapt them to clear the intermediate beam of the pair of beams. The two couplers are connected at their ends by bolts to alternate plow-beams. Thus the coupler 21 on the right hand is connected to the first and third beams of the series, while the coupler on the left hand is connected to the second and fourth beams of the series. This arrangement of the couplers and beams enables the operator to control either of the outside plows by simply moving its corresponding inner plow, and as the plows are counterbalanced by the mechanism hereinbefore described it will readily be seen that they can be readily adjusted and controlled with a minimum effort on the part of the attendant. The handles of the two inner or middle plows are designed to be grasped by the operator when the machine is in use.

The hangers are stayed and strengthened by a series of inclined brace-rods 23, which extend from the lower ends of the hangers to the front beam 3 of the carrying-frame, to which beam said rods are bolted. The rear lower end of each of the inclined brace-rods is bifurcated and fitted to straddle the lower end of its hanger, and through said bifurcated end of the brace-rod is passed the bolt 8, which thus serves the twofold purpose of securing the brace-rod and hanger together and as the fulcrum for the shackle bar or lever.

I will now proceed to describe the mechanism for hitching three draft-animals to the machine in such manner as to permit them to walk between the rows being cultivated without injuring the growing plants.

To the tongues 1 2, at a short distance in rear of the front longitudinal beam of the carrying-frame, I affix swivels 24 25, and to these swivels are centrally secured the doubletrees 26. Depending from the lower side of the front longitudinal beam 3 of the carrying-frame are a series of swivels 27, 28, and 29, which are suitably secured in place on said beam and spaced equidistant from each other, the swivels 27 and 29 being located near the outer ends of the doubletrees, while the intermediate swivel is located near the inner ends of said doubletrees. To these depending swivels are pivoted bell-crank levers 30, 30', and 31, said levers being pivoted at the juncture of the arms forming the same to the swivels, and being arranged in a vertical position below the carrying-frame. The bell-crank levers 30 and 30' are connected to the outer depending swivels 27 and 29, and the arms of both of said bell-crank levers are equal in length; but the intermediate bell-crank 28, which is connected to the swivel 31, has its horizontal arm shorter by one-half than its vertical depending arm. The vertical arms of said bell-crank levers are connected by intermediate links or rods 32 with the doubletrees, the outer bell-crank levers 27 and 29 being connected to the outer ends of the doubletrees, while the intermediate bell-crank lever is connected to the inner ends of both doubletrees, as is obvious from an inspection of Fig. 4 of the drawings.

A series of three whiffletrees 33 are employed to connect a like number of animals to the machine, and one of these whiffletrees is connected to the horizontal arm of each of the bell-crank levers by an intermediate ring or other suitable connection.

Between the front and rear beams 3 4 of the carrying-frame, at the outer ends thereof, are located braces 35, the rear end of each brace being bolted to the rear beam 4; but the front end of the brace is connected to the bolt 36, that passes through the swivels of the outer bell-crank levers 27 29, whereby the swivels, the bell-crank levers, and the fulcrum-bolt of the latter are relieved of undue strain.

In Fig. 5 of the drawings I have shown my improved neck-yoke, in which I employ two poles 40 41, which are hung centrally on the front ends of the tongues, preferably by interlocking eyes, and to the inner ends of said poles are connected rings or eyes 42, to which the middle draft-animal is adapted to be connected, while the outer ends of said poles are provided with rings 43, which are adapted to slide freely on longitudinal guides 44, the two outer sliding rings being adapted to have the outside horses connected thereto.

The operation and advantages of my invention will be readily understood and appreciated by those skilled in the art to which my invention relates from the foregoing description, taken in connection with the drawings, and hence I do not deem it necessary to repeat the same here.

I would have it understood that I do not restrict myself to the details of construction and form and proportion of parts herein shown and described as an embodiment of my invention, as I am aware that numerous changes therein can be made without departing from the spirit or sacrificing the advantages of my invention.

Having thus fully described my invention, what I claim as new, and desire to secure by Letters Patent, is—

1. In a double straddle-row cultivator, the combination of a carrying-frame, a series of plow-beams depending therefrom, and couplers connected to alternate beams of the series of plow-beams, substantially as and for the purpose described.

2. In a double straddle-row cultivator, the combination of a carrying-frame, the series of plow-beams, and couplers for connecting the beams in pairs, each coupler being arched to straddle one of the plow-beams and connected to alternate beams, substantially as and for the purpose described.

3. In a double straddle-row cultivator, the combination of a carrying-frame, a series of spaced vertical shackle bars or levers fulcrumed at or near their lower ends in suitable supports, a horizontal shaft or bar supported in an elevated position on said frame and having each of said vertical shackle bars or levers connected rigidly thereto, a series of plow-beams each connected to the lower end of one of said shackle bars or levers and limited against vertical motion thereon, and a counterbalance-spring connected to said horizontal shaft or bar, substantially as described, for the purpose set forth.

4. In a double straddle-row cultivator, the combination of a carrying-frame, a series of spaced vertical shackle-levers each independently fulcrumed in a suitable support rigid on the frame, a single continuous shaft or bar arranged in close proximity to the upper ends of all the shackle-levers of the series and connected rigidly with the same, a series of plow-beams each connected by a vertical bolt to the lower end of one of the shackle-levers, and a single bent counterbalance-spring secured at one end to the shaft or bar and at its other end to the carrying-frame, substantially as described, for the purpose set forth.

5. In a double straddle-row cultivator, the combination of a carrying-frame, a horizontal shaft or bar supported on said frame, a series of spaced vertical shackle-levers fulcrumed at their lower ends in suitable supports and each having an adjustable connection at its upper end with the shaft or bar, the series of plow-beams connected by a vertical bolt to the lower ends of the shackle-levers, and a counterbalance-spring connected to the shaft or bar, substantially as described, for the purpose set forth.

6. In a double straddle-row cultivator, the combination of a carrying-frame, a series of plow-beams, a shaft or bar supported on the frame, and a series of vertical shackle bars or levers each connected to said shaft or bar and adjustable individually thereon to elevate or depress the plow-beam connected to said shackle-bar, substantially as and for the purpose described.

7. In a double straddle-row cultivator, the combination of a carrying-frame, a series of depending hangers rigidly supported on the frame, the vertical shackle-levers each having an angular arm at its lower end which is fitted in said hanger and fulcrumed on a suitable bolt or shaft, a single shaft or bar journaled on said frame and having the upper ends of all of the shackle-levers connected rigidly thereto, a counterbalance-spring connected to said shaft or bar, a series of plow-beams each connected by a vertical pivot-bolt to one of said shackle-levers, and arched couplers connected to alternate plow-beams, substantially as described, for the purpose set forth.

8. In a double straddle-row cultivator, the combination of a carrying-frame, a series of hangers fixed thereto, a shaft or bar supported on said frame, a shackle-bar fulcrumed at its lower end in each hanger and having a threaded angular upper end, which is adjustably connected to the shaft or bar by nuts, as described, and a counterbalance-spring, all arranged and combined for service substantially as described.

9. The combination, with a carrying-frame having a horizontal front bar, of the doubletrees arranged on the upper side of the frame and pivoted centrally thereto, a series of spaced bell-crank levers each arranged in a vertical position on the lower side of the front bar of the carrying-frame and independently fulcrumed thereon, the middle lever of the series having its horizontal arm shorter than its vertical arm and connected to the inner ends of the doubletrees, and the outer bell-crank levers having their horizontal arms connected to the outer ends of the doubletrees, and a series of whiffletrees connected to the vertical arms of the bell-crank levers, substantially as described.

10. In a double straddle-row cultivator, the combination of a carrying-frame, the overhung doubletrees, a series of swivels secured at intervals to the lower side of the carrying-frame, a series of bell-crank levers fulcrumed in said swivels, the vertical arms of the outer levers being connected to the outer ends of the doubletrees by intermediate rods, and the corresponding arm of the intermediate lever being connected to the inner ends of both doubletrees, and a whiffletree connected to the free arm of each bell-crank lever, substantially as and for the purpose described.

In testimony whereof I affix my signature in presence of two witnesses.

JOHN LAWRIE.

Witnesses:
BENTON THOMPSON,
ALEXANDER J. YOST.